United States Patent
Asakawa et al.

(10) Patent No.: US 11,466,173 B2
(45) Date of Patent: Oct. 11, 2022

(54) PRINTING METHOD AND PRINTING APPARATUS

(71) Applicant: Seiko Epson Corporation, Tokyo (JP)

(72) Inventors: Yuta Asakawa, Azumino (JP); Akira Mizutani, Matsumoto (JP); Akiko Matsuzaki, Matsumoto (JP)

(73) Assignee: SEIKO EPSON CORPORATION

( * ) Notice: Subject to any disclaimer, the term of this patent is extended or adjusted under 35 U.S.C. 154(b) by 133 days.

(21) Appl. No.: 16/934,057

(22) Filed: Jul. 21, 2020

(65) Prior Publication Data

US 2021/0024767 A1    Jan. 28, 2021

(30) Foreign Application Priority Data

Jul. 22, 2019   (JP) .............................. JP2019-134357

(51) Int. Cl.
| | | |
|---|---|---|
| *C09D 11/54* | (2014.01) | |
| *B41J 11/00* | (2006.01) | |
| *B41M 5/00* | (2006.01) | |
| *B41M 7/00* | (2006.01) | |
| *C09D 11/12* | (2006.01) | |
| *C09D 11/101* | (2014.01) | |

(52) U.S. Cl.
CPC ............. *C09D 11/54* (2013.01); *B41J 11/002* (2013.01); *B41M 5/0017* (2013.01); *B41M 7/009* (2013.01); *C09D 11/101* (2013.01); *C09D 11/12* (2013.01)

(58) Field of Classification Search
CPC ..... B41J 2/2117; B41J 11/0015; B42D 25/43; C09D 11/12; C09D 11/326
See application file for complete search history.

(56) References Cited

U.S. PATENT DOCUMENTS

| | | | | |
|---|---|---|---|---|
| 8,817,316 | B2 * | 8/2014 | Yoshida ................. | G06K 15/02 |
| | | | | 358/1.18 |
| 9,850,391 | B2 * | 12/2017 | Fukuoka ............... | C09D 11/326 |
| 2006/0158473 | A1 * | 7/2006 | Mills .................... | B41J 11/0015 |
| | | | | 347/15 |
| 2012/0049506 | A1 * | 3/2012 | Nikkila .................. | B42D 25/43 |
| | | | | 283/85 |
| 2013/0021401 | A1 * | 1/2013 | Okuda ................... | B41J 2/2117 |
| | | | | 347/15 |
| 2015/0054883 | A1 * | 2/2015 | Okuda ................... | C09D 11/54 |
| | | | | 524/556 |
| 2017/0021641 | A1 * | 1/2017 | Goi ....................... | C09D 11/107 |
| 2017/0166767 | A1 * | 6/2017 | Watanabe .............. | C09D 11/38 |
| 2019/0100048 | A1 | 4/2019 | Ohta | |

FOREIGN PATENT DOCUMENTS

JP    2019-064087 A    4/2019

* cited by examiner

*Primary Examiner* — John Zimmermann
(74) *Attorney, Agent, or Firm* — Harness, Dickey & Pierce, P.L.C.

(57) ABSTRACT

A printing method for printing a printing medium whose printed side will be laminated after being printed. The printing method includes a non-white ink application step of applying an aqueous non-white ink composition containing a non-white coloring material onto the printing medium, a white ink application step of applying an aqueous white ink composition containing a white coloring material onto the non-white ink composition on the printing medium, and a clear ink application step of applying a clear ink composition containing a resin onto the white ink composition on the printing medium.

16 Claims, 1 Drawing Sheet

PRINTING METHOD AND PRINTING APPARATUS

The present application is based on, and claims priority from JP Application Serial Number 2019-134357, filed Jul. 22, 2019, the disclosure of which is hereby incorporated by reference herein in its entirety.

BACKGROUND

1. Technical Field

The present disclosure relates to a printing method and a printing apparatus.

2. Related Art

For example, JP-A-2019-64087 discloses a printing method for printing poorly absorbent or non-absorbent printing media, such as transparent flexible packing films, with an aqueous ink composition (hereinafter often referred to as aqueous ink), which contains water as the main constituent. Such a printing method includes a rear side printing made in which a transparent film is printed with a non-white ink and then with a white ink over the non-white ink.

Such a printing method has a rear side printing made in which a transparent flexible film is printed, first, with a non-white ink and then with a white ink to form a coating over the non-white ink. In the rear side printing mode, the white ink coating may be covered with a protective film to protect the printed side of the printed item. The white ink coating and the protective film should have high adhesion therebetween, that is, should be resistant to peeling (this characteristic is hereinafter referred to as resistance to laminate peeling or laminate peel resistance).

SUMMARY

1. Accordingly, there is provided a printing method for printing a printing medium whose printed side will be laminated after being printed. The printing method includes a non-white ink application step of applying an aqueous non-white ink composition containing a non-white coloring material onto the printing medium, a white ink application step of applying an aqueous white ink composition containing a white coloring material onto the non-white ink composition on the printing medium, and a clear ink application step of applying a clear ink composition containing a resin onto the white ink composition on the printing medium.

2. In the printing method of 1, the clear ink composition may have a wax content limited to 3% or less relative to the total mass of the clear ink composition.

3. In the printing method of 1 or 2, one of the non-white ink composition and the white ink composition may contain a wax, and the clear ink composition contains a wax with a content twice or more as high as the wax content in the non-white or white ink composition.

4. In the printing method of any one of 1 to 3, the white ink composition may contain a urethane resin.

5. In the printing method of any one of 1 to 4, the white coloring material contain 8% to 15% of the white coloring material relative to the total mass of the white ink composition.

6. In the printing method of any one of 1 to 5, the non-white ink application step, the white ink application step, and the clear ink application step each may be performed by ejecting the corresponding ink composition from an ink jet head.

7. In the printing method of 1 or 6, the non-white ink application step, the white ink application step, and the clear ink application step each may be performed by ejecting the corresponding ink composition from an ink jet line head having a dimension larger than the width of the printing medium so as to be able to print one entire line of an image by one scanning motion.

8. In the printing method of 7, the non-white ink application step and the white ink application step may be performed on the printing medium fed at a speed of 15 m/min or more.

9. The printing method of any one of 1 to 8 may further include a post-application drying step of heating the printing medium with an infrared heater after the clear ink application step.

10. In the printing method of any one of 1 to 9, the clear ink composition may be applied at a rate of 0.5 mg/inch$^2$ or more.

11. In the printing method of any one of 1 to 10, the printing medium may be not or poorly absorbent.

12. The printing method of any one of 1 to 11 may further include a treatment liquid application step of applying a treatment liquid containing a flocculant onto the printing medium.

13. In the printing method of any one of 1 to 12, the non-white ink composition and the white ink composition each may have an organic solvent content limited to 15% or less relative to the total mass of the corresponding ink composition.

14. The printing method of any one of 1 to 13 may further include a lamination step of laminating the printed side of the printing medium.

15. In the printing method of any one of 1 to 14, the printing medium may have a thickness of 5 μm to 70 μm.

16. In the printing method of any one of 1 to 15, the white coloring material may be an inorganic oxide pigment.

17. The present disclosure is also directed to a printing apparatus operable to print a printing medium whose printed side will be laminated after being printed. The printing apparatus include a non-white ink applying section configured to apply an aqueous non-white ink composition containing a non-white coloring material onto the printing medium, a white ink applying section configured to apply an aqueous white ink composition containing a white coloring material onto the non-white ink composition on the printing medium, and a clear ink applying section configured to apply a clear ink composition containing a resin onto the white ink composition on the printing medium.

DESCRIPTION OF EXEMPLARY EMBODIMENTS

Exemplary embodiments of the present disclosure will now be described. The following embodiments will be described by way of example. The subject matter of the present disclosure can be implemented without being limited to the following embodiments, and various modifications may be made within the scope and spirit of the disclosure.

The printed method disclosed herein is implemented as a method for printing a printing medium whose printed side will be laminated after being printed and includes a non-white ink application step of applying an aqueous non-white ink composition containing a non-white coloring material onto the printing medium, a white ink application step of applying an aqueous white ink composition containing a white coloring material onto the non-white ink composition on the printing medium, and a clear ink application step of applying a clear ink composition containing a resin onto the white ink composition on the printing medium.

The present disclosure is also directed to a printing apparatus operable to print a printing medium whose printed side will be laminated after being printed. The printing apparatus include a non-white ink applying section configured to apply an aqueous non-white ink composition containing a non-white coloring material onto the printing medium, a white ink applying section configured to apply an aqueous white ink composition containing a white coloring material onto the non-white ink composition on the printing medium, and a clear ink applying section configured to apply a clear ink composition containing a resin onto the white ink composition on the printing medium.

The printing method and the printing apparatus disclosed herein will be described in the following order: the printing apparatus, ink compositions, a treatment liquid, a printing medium, and the printing method.

1. COMPONENTS OF PRINTING SYSTEM 1. 1. Printing Apparatus

Figure 1:
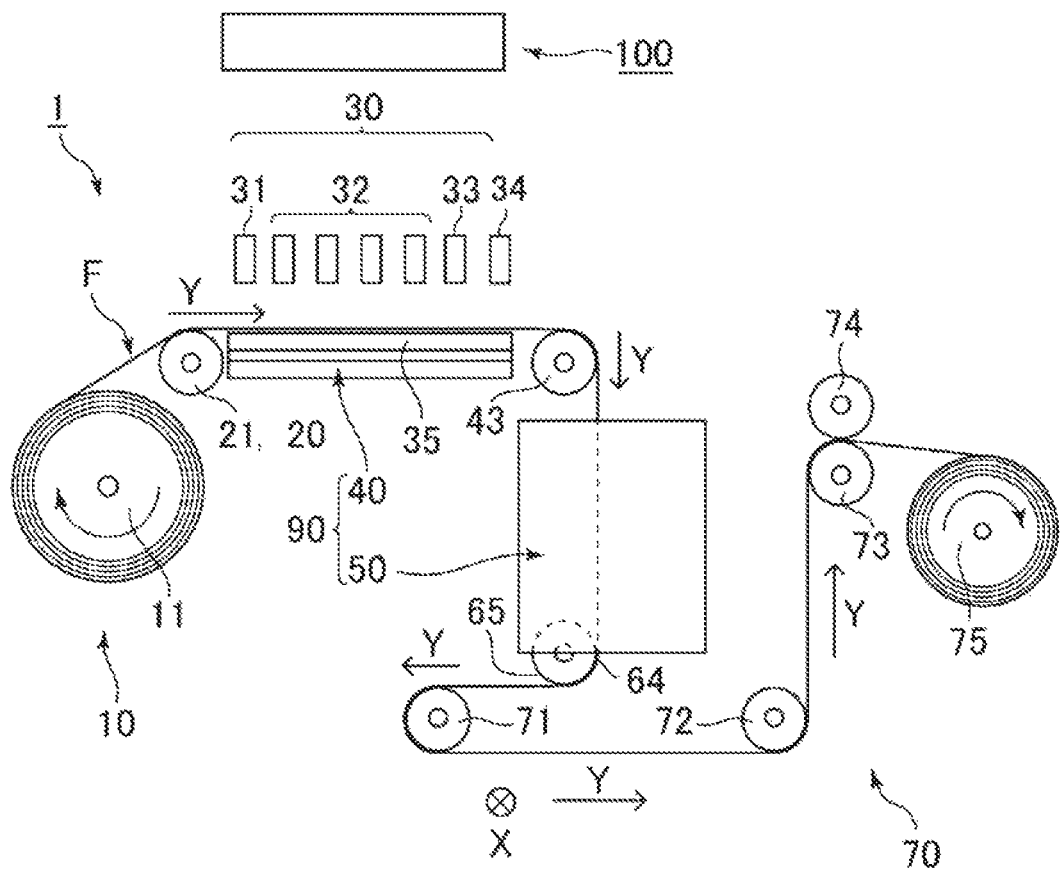
FIG. 1 is a schematic sectional view illustrating the entirety of an ink jet printing apparatus used in an embodiment of the present disclosure.

An ink jet printing apparatus as an implementation of the present disclosure will now be described with reference to the drawings. FIG. 1 is a schematic sectional view illustrating the entirety of an ink jet printing apparatus 1 that is an implementation according to an embodiment of the present disclosure.

As depicted in FIG. 1, the ink jet printing apparatus 1 includes a printing medium supply unit 10, a feed unit 20, a printing unit 30, a dryer set 90, a drying device 100, and a medium ejection unit 70.

The supply unit 10 is operable to supply a rolled printing medium F, which is a type of printing medium, to the feed unit 20. More specifically, the supply unit 10 includes a medium roll holder 11 that holds the rolled printing medium F. The printing medium F is supplied to the feed unit 20 downstream in the medium feeding direction Y by rotating the roll of the printing medium F.

The feed unit 20 is operable to feed the printing medium F coming from the supply unit 10 to the printing unit 30. More specifically, the feed unit 20 includes a first feed roller 21 to feed the printing medium F supplied thereto to the printing unit 30 located downstream in the medium feeding direction Y.

The printing unit 30 is configured to eject a treatment liquid, ink compositions, and a clear ink composition to apply those liquid and compositions onto the printing medium F fed from the feed unit 20. More specifically, the printing unit 30 includes a treatment liquid applying section 31, non-white ink applying sections 32, a white ink applying section 33, a clear ink applying section 34, and a platen 35. The treatment liquid applying section 31 is operable to eject a treatment liquid capable of flocculating one or more constituents of the inks through nozzles (not shown) to apply the treatment liquid onto the printing medium F. The non-white ink applying sections 32 are operable to eject respective non-white inks through nozzles (not shown) to apply the inks onto the printing medium F, thus forming a non-white ink coating C depicted in FIG. 2. The white ink applying section 33 is operable to eject a white ink through nozzles (not shown) to apply the white ink onto the printing medium F, thus forming a white ink coating W. The clear ink applying section 34 is operable to eject a clear ink through nozzles (not shown) to apply the clear ink onto the printing medium F, thus forming a clear ink coating CL over the white ink coating. The platen 35 is configured to support the printing medium F from the rear side of the printing medium.

The treatment liquid applying section 31, the non-white ink applying sections 32, and the white ink applying section 33 are ink jet heads held in a carriage together. Each ink jet head is a line head having a dimension larger than the width of the printing medium F in direction X parallel to the width of the printing medium F. The ink jet line head is thus adapted for one-pass printing (line printing) that is a manner in which one entire line of an image is printed by one scanning motion. The scanning motion in this instance is such that the ink jet heads in a stational position eject the treatment liquid and the ink compositions to apply the treatment liquid and ink compositions onto the printing medium F being fed in a Y direction. For the ejection from the ink jet heads, a known technique may be used. In the present embodiment, vibration of piezoelectric elements, that is, mechanical deformation of electrostrictive elements, is used for ejection.

In an embodiment, however, the ink jet printing apparatus 1 may be a serial printer, whose scanning motion (main scanning motion) is such that the ink jet heads that are moving in the front-to-back direction of FIG. 1, or in an X direction, eject the ink compositions and a treatment liquid to apply the inks and treatment liquid onto the printing medium F opposing the ink jet heads.

A second feed roller 43 is disposed downstream from the platen 35 in the medium feeding direction Y. The second feed roller 43 is configured to feed the printed medium F to a second dryer 50 located downstream in the medium feeding direction Y.

The dryer set 90 includes a first dryer 40 and the second dryer 50. The first dryer 40 is used for primary drying to dry the treatment liquid and the ink compositions on the printing medium F. The first dryer 40 may be, for example, an infrared heater or a thermal conduction heater, such as a nichrome wire heater. The first dryer 40 may be provided with a blower.

The drying device 100, which is a blowing mechanism for drying and disposed over the printing medium F, blows air downward onto the printing medium F to dry the treatment liquid and primarily dry the ink compositions. The drying device 100 includes a radiation irradiation mechanism and is operable to irradiate the printing medium with radiation for drying the treatment liquid and inks. The drying device 100 is involved in the primary drying. The first dryer 40 and the drying device 100 are not necessarily essential, and either or both of them are provided as required. In an embodiment, they are not provided.

The second dryer 50 dries printed items produced by the printing method disclosed herein by heating. The second dryer 50 includes, for example, a blowing mechanism (not shown) operable to blow air on the printing medium F, a heat conduction mechanism having a surface along which the printing medium F is fed. The heat conduction mechanism heats the surface to conduct heat to the printing medium F from the surface. The second dryer 50 also includes a radiation irradiation mechanism, such as an infrared heater, which is operable to irradiate the printing medium F with infrared radiation to heat the printing medium F. A third feed roller 65 is located near the exit 64 of the second dryer 50. The third feed roller 65 is disposed in such a manner as to come into contact with the rear side of the printing medium F and to feed the printing medium F to the medium ejection section 70 located downstream in the medium feeding direction Y.

The medium ejection section 70 is operable to further feed the printing medium F fed from the second dryer 50 downstream in the medium feeding direction Y and eject the printing medium F from the ink jet printing apparatus 1. More specifically, the medium ejection section 70 includes a fourth feed roller 71, a fifth feed roller 72, a sixth feed roller 73, a seventh feed roller 74, and a take-up roller 75. The fourth feed roller 71 and the fifth feed roller 72 are disposed in such a manner as to come into contact with the surface of the printing medium F. The sixth feed roller 73 and the seventh feed roller 74 define a roller pair. The printing medium F ejected by the sixth feed roller 73 and the seventh feed roller 74 is wound on the take-up roller 75.

The surface temperature of the printing medium F during printing may be controlled to, at most, 45° C. or less in the region opposing the ink jet heads. In some embodiments, the surface temperature in this region may be 40° C. or less, 38° C. or less, or 35° C. or less. In an embodiment, the surface temperature in this region may be controlled to 30° C. or less, 28° C. or less, or 25° C. or less. Also, the surface temperature of the first dryer 40 may be controlled to, at least, 20° C. or more, for example, 23° C. or more, 25° C. or more, or 28° C. or more. In some embodiments, it may be controlled to 30° C. or more or 32° C. or more. Thus, the ink compositions and the treatment liquid in the ink jet heads are not much exposed to radiant heat from the dryer or the drying divide. Consequently, the ink compositions and the treatment liquid in the ink jet heads are kept from drying or changing in composition and from melting and adhering to the inner walls of the ink jet heads. Also, the ink compositions and the treatment liquid can be rapidly fixed, thus increasing image quality.

The surface temperature of the printing medium F described above is the highest temperature in the region opposing the ink jet heads. When the primary drying is performed with the first dryer 40 and the drying device 100, the surface temperature is the primary drying temperature. If the primary drying is not performed, the surface temperature of the printing medium is the temperature around the printing medium in the region opposing the ink jet heads.

The second dryer 50 is intended to dry and solidify the ink on the printing medium F, that is, acts as a heater for the secondary heating or drying. The second dryer 50 heats the image printed on the printing medium F to rapidly evaporate the water and other solvents from the ink in the image, so that the resin remaining in the ink forms an ink film. Thus, the ink film is firmly fixed or adheres to the printing medium F, thus forming a high-quality image in a short time. The upper limit of the surface temperature of the printing medium F heated by the second dryer 50 may be 120° C. or less, for example, 100° C. or less or 90° C. or less. Also, the lower limit of the surface temperature of the printing medium F at this time may be 60° C. or more, for example, 70° C. or more or 80° C. or more. By controlling the surface temperature of the printing medium in such a range, high-quality images can be formed in a short time. The surface temperature of the printing medium F is controlled in terms of the highest temperature.

The ink jet printing apparatus 1 further includes a control unit (not shown). The control unit controls the printing medium supply unit 10, the feed unit 20, the printing unit 30, the dryer set 90, the drying device 100, and the medium ejection section 70 when the ink jet printing apparatus 1 operates for printing.

1. 2. Ink Compositions

The ink compositions (hereinafter often referred to as the inks) used in the printing method disclosed herein will now be described.

In some embodiments of the present disclosure, the ink compositions are used for ink jet printing together with the treatment liquid capable of flocculating one or more constituents of the inks from the viewpoint of forming high-quality images even at a high speed. Aqueous ink jet ink compositions containing water as the main constituent may be used as such ink compositions.

An ink jet ink composition mentioned herein is an ink composition used in an ink jet printing method. An "aqueous" composition mentioned herein denotes a composition containing water as one of the main solvents. The water content in such an ink composition may be 40% by mass or more and is beneficially 45% by mass or more, for example, 50% by mass or more or 60% by mass or more.

The ink compositions used in the printing method disclosure herein includes three types: at least one aqueous non-white ink composition containing a non-white coloring material (hereinafter often referred to as a color ink); an aqueous white ink composition containing a white coloring material (hereinafter often referred to as a white ink); and a clear ink composition containing a resin. The basic compositions of the non-white ink and the white ink are the same except for the hue angle that varies depending on the coloring material used. The non-white ink and white ink compositions used herein are coloring inks intended to color the printing medium.

In contrast, the clear ink composition is not intended to color the printing medium and, therefore, the coloring material content, by mass, in the clear ink composition is beneficially 0.1% or less, for example, 0.05% or less or 0.01% or less. In some embodiments, the coloring material content may be 0% by mass. The constituents except the coloring material of the clear ink composition may be the same as, but selected independent of, those of the coloring inks.

The constituents in the inks used in the printing method disclosed herein will now be described.

1. 2. 1. Water

In the embodiments of the present disclosure, the inks contain water. The water is a dominant medium of the inks and is evaporated by drying. Beneficially, the water is pure water or ultra-pure water from which ionic impurities are removed as much as possible. Examples of such water include ion exchanged water, ultrafiltered water, reverse osmosis water, and distilled water. Sterile water prepared by, for example, UV irradiation or addition of hydrogen peroxide may be used. Sterile water can reduce the occurrence of mold or bacteria and the use thereof is beneficial for storing the aqueous ink composition for a long period.

The water content may be 40% or more, for example, 50% or more or 60% or more, relative to the total mass of the ink. The upper limit of the water content may be, but is not limited to, for example, 99% by mass or less.

1. 2. 2. Coloring Material

The coloring material may be a dye or a pigment. Pigments are colorfast to light and gases and are accordingly beneficial. Images formed with a pigment on a printing medium not only have high image quality but also are so resistant to water, gases, and light as can be stably preserved. Such features are apparent particularly when images are formed on a poorly ink-absorbent or ink-non-absorbent printing medium.

Pigments that can be used herein include, but are not limited to, inorganic pigments and organic pigments. Exemplary inorganic pigments include titanium oxide, iron oxide, and carbon blacks produced by known methods, such as the contact method, the furnace method, and the thermal method. Exemplary organic pigments include azo pigments, polycyclic pigments, nitro pigments, nitroso pigments, and aniline black. Azo pigments include azo lake, insoluble azo pigments, condensed azo pigments, and chelate azo pigments. Polycyclic pigments include phthalocyanine pigments, perylene pigments, perinone pigments, anthraquinone pigments, and quinophthalone pigments.

For a black ink that is one of the non-white inks, a carbon black may be used as the non-white pigment. Examples of the carbon black include, but are not limited to, C. I. Pigment Black 7, such as furnace black, lampblack, acetylene black, and channel black; and commercially available carbon blacks, such as No. 2300, 900, MCF88, No. 20B, No. 33, No. 40, No. 45, No. 52, MA7, MA8, MA77, MA100, and No. 2200B (all produced by Mitsubishi Chemical); Color Blacks FWI, FW2, FW2V, FW18, FW200, S150, S160, and S170, Pritex 35, Pritex U, Pritex V, Pritex 140U, and Special Blacks 6, 5, 4A, 4, and 250 (all produced by Degussa); and Conductex SC, Raven 1255, Raven 5750, Raven 5250, Raven 5000, Raven 3500, and Raven 700 (all produced by Carbon Columbia); and Regal 400R, Regal 330R, Regal 660R, Mogul L, Monarch 700, Monarch 800, Monarch 880, Monarch 900, Monarch 1000, Monarch 1100, Monarch 1300, Monarch 1400, and Elftex 12 (all produced by Cabot).

Examples of the white pigment used in the white ink include, but are not limited to, C. I. Pigment Whites 6, 18, and 21 and inorganic white pigments, such as, titanium oxide, zinc oxide, zinc sulfide, antimony oxide, magnesium oxide, silicon dioxide, and zirconium oxide. Also, organic white pigments, such as white hollow resin particles and polymer particles, may be used apart from such inorganic white pigments.

For a yellow ink that is one of the non-white inks, examples of the non-white pigment include, but are not limited to, C. I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

For a magenta ink that is one of the non-white inks, examples of the non-white pigment include, but are not limited to, C. I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C. I. Pigment Violets 19, 23, 32, 33, 36, 38, 43, and 50. Solid solutions of those pigments may also be used as the non-white pigment.

For a cyan ink that is one of the non-white inks, examples of the non-white pigment include, but are not limited to, C. I. Pigment Blues 1, 2, 3, 15, 15:1, 15:2, 15:3, 15:34, 15:4, 16, 18, 22, 25, 60, 65, and 66; and C. I. Vat Blues 4 and 60.

Non-white pigments that can be used in non-white inks other than magenta, cyan, and yellow include, but are not limited to, C. I. Pigment Greens 7 and 10, C. I. Pigment Browns 3, 5, 25, and 26, and C. I. Pigment Oranges 1, 2, 5, 7, 13, 14, 15, 16, 24, 34, 36, 38, 40, 43, and 63.

Pearl pigments may also be used as the non-white pigment, and examples thereof include, but are not limited to, pigments exhibiting pearly gloss or interference gloss, such as titanium dioxide-coated mica, fish scale foil, and bismuth oxychloride.

Metallic pigments that can be used as the non-white pigment include, but are not limited to, elemental metals, such as aluminum, silver, gold, platinum, nickel, chromium, tin, zinc, indium, titanium, and copper and alloys thereof.

The lower limit of the coloring material content in the non-white inks may be 0.5% or more, for example, 1% or more or 3% or more, relative to the total mass of the ink composition. Also, the upper limit of the coloring material content in the non-white inks may be 10% or less, for example, 7% or less or 6% or less, relative to the total mass of the ink composition. When the coloring material content is in such a range, images formed on a printing medium are colorfast to water, gases, light, and the like, and the inks can be stably preserved.

In the white ink, the lower limit of the coloring material content may be 3% or more, for example, 5% or more, 7% or more, or 8% or more, relative to the total mass of the ink composition. Also, the upper limit of the coloring material content in the white ink may be 18% or less, for example, 15% or less or 13% or less, relative to the total mass of the ink composition. When the white coloring material content is in such a range, images formed on a printing medium are colorfast to water, gases, and light, and have sufficient opacity. Also, such a white ink can be stably preserved. Incidentally, the coatings formed of the white ink containing a white pigment are likely to form an uneven surface that is unsuitable for sufficient resistance to laminate peeling. Accordingly, in the printing method disclosed herein, the inks are controlled in terms of the organic solvent content and the amount applied, as will be described later herein so that the white ink coating can adhere firmly to the laminating film and exhibit high laminate peel resistance, despite having an uneven surface.

When a pigment is used as the coloring material, the pigment may be in the form of a dispersion liquid. The pigment dispersion liquid contains the pigment and a solvent and optionally a dispersant. The solvent may be water and/or a hydrophilic solvent, such as diethylene glycol. The dispersant may be a styrene-acrylic acid copolymer. The acid value of the dispersant may be, but is not limited to, 20 mg KOH/g or more from the viewpoint of uniformly dispersing the pigment.

In the clear ink used in the printing method disclosed herein, the coloring material content may be, by mass, 0.2% or less, for example, 0.1% or less or 0.05% or less, and the lower limit thereof may be 0% by mass. The clear ink is not intended to color the printing medium and is used for other purposes. For example, the clear ink may be used to increase the rub resistance and other properties of the printed item, to adjust the gloss of the printing medium, to fix non-white inks, or to improve color development. In the printing method disclosed herein, the clear ink is applied onto the white ink coating to form a clear ink coating. The clear ink coating will finally be laminated and functions as a protective layer to increase the adhesion to the laminating film, thus enhancing the resistance to laminate peeling and rubbing. The clear ink is not the treatment liquid described later herein and, therefore, contains no flocculant.

1. 2. 3. Organic Solvent

In some embodiments, the inks may contain an organic solvent. The organic solvent facilitates consistent ejection of the ink and helps the ink ejected onto the printing medium to permeate and dry. Thus, images formed with such an ink exhibit high image quality and rub resistance.

The organic solvent used in the inks may be soluble in water. Inks containing a water-soluble organic solvent can dry rapidly and permeate easily. Images formed with such an ink exhibit high image quality and rub resistance.

Examples of the water-soluble organic solvent include, but are not limited to, alkanediols, polyols, nitrogen-containing solvents, esters, glycol ethers, and cyclic esters.

Exemplary alkanediols include 1,2-alkanediols, such as ethylene glycol, propylene glycol, 1,2-propanediol, 1,2-butanediol, 1,2-pentanediol, 1,2-hexanediol, and 1,2-octanediol, 1,3-propanediol, 1,4-butanediol, and 1,6-hexanediol. Such solvents may be used individually or in combination. Alkanediols are beneficial for increasing the wettability of the ink composition on the printing medium and helping the ink composition to permeate the printing medium. In particular, 1,2-alkanediols are beneficial for helping permeation and may be often used as the organic solvent. In some embodiments, a diol of an alkane having a carbon number of 5 or more may be used. In this instance, the alkane may be linear or branched, and the carbon number thereof may be from 5 to 9.

Exemplary polyols include diethylene glycol, triethylene glycol, dipropylene glycol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, and glycerin. Such polyols may be used individually or in combination. Polyols are beneficial as a moisturizing agent. The polyol used in the ink composition may be a compound formed by binding two or more hydroxy groups to an alkane having a carbon number of 4 or less, or a compound formed by 2 to 4 intermolecular condensations of some of the hydroxy groups of compounds formed by binding two or more hydroxy groups to an alkane having a carbon number of 4 or less. Polyols are compound having two or more hydroxy groups in the molecule thereof. In some embodiments according to the present disclosure, the number of hydroxy groups may be 2 or 3.

Exemplary nitrogen-containing solvents include pyrrolidones, such as N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. Such solvents may be used individually or in combination. Nitrogen-containing solvents, which act as a favorable dissolving agent for resin, help the ink composition to produce printed items having high resistance to rubbing and prevent the ink composition from clogging the nozzles of the ink jet head for consistent ejection.

The nitrogen-containing solvent may be an alkoxyalkylamide, and examples thereof include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide. Inks containing a nitrogen-containing solvent are beneficial for improving rub resistance, image quality, and the like.

In an embodiment, an amide-based solvent may be used as the nitrogen-containing solvent. The amide-based solvent may be a cyclic amide-based solvent or an acyclic amide-based solvent. The cyclic amide-based solvent may be any one of the above-cited pyrrolidines. The acyclic amide-based solvent may be any one of the above-cited alkoxyalkylamides.

Exemplary esters include glycol monoacetates, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate; and glycol diesters, such as ethylene glycol diacetate, diethylene glycol diacetate, propylene glycol diacetate, dipropylene glycol diacetate, ethylene glycol acetate propionate, ethylene glycol acetate butylate, diethylene glycol acetate butylate, diethylene glycol acetate propionate, diethylene glycol acetate butylate, propylene glycol acetate propionate, propylene glycol acetate butylate, dipropylene glycol acetate butylate, and dipropylene glycol acetate propionate.

Exemplary glycol ethers include alkylene glycol monoethers and alkylene glycol diethers. In some embodiments, an alkyl ether may be used. More specifically, examples of such an alkylene glycol ether include alkylene glycol monoalkyl ethers, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether; and alkylene glycol dialkyl ethers, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether. Such glycol ethers are effective in controlling the wettability of the ink composition on the printing medium.

In an embodiment, alkylene glycol dieters may be more beneficial than alkylene glycol monoethers. Alkylene glycol diethers are more likely to dissolve or swell the resin in the ink and tend to increase the rub resistance of the resulting image. Alkylene glycol monoethers are, however, beneficial as a penetrating solvent capable of permeating into the printing medium. In some embodiments, the glycol ether may be a product of etherification, with a hydroxy group, of an alkanediol having a carbon number of 4 or less or of an intermolecular condensate between hydroxy groups of the alkanediol. If the glycol ether is an intermolecular condensate, the number of condensations may be 2 to 4. The etherification may be an alkyl etherification using an alky group having a carbon number of 1 to 4.

Exemplary cyclic esters include lactones, such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, and ε-decanolactone; and compounds derived from these lactones by substituting an alkyl group having a carbon number of 1 to 4 for the hydrogen of the methylene group adjacent to the carbonyl group of the lactone.

The organic solvent content may be 1% or more, for example, 3% or more or 5% or more, relative to the total mass of the ink composition. Also, the organic solvent content may be 30% or less, for example, 20% or less, 15% or less, 12% or less, or 10% or less, relative to the total mass of the ink composition. In some embodiments, the organic solvent content may be 8% by mass or less or 5% by mass or less. When the organic solvent content is in such a range, the remaining organic solvent content in the ink coating of the resulting printed item can be so low as can ensure a resistance to laminate peeling. Also, such an ink can dry rapidly. Accordingly, the use thereof leads to a reduced primary drying time or temperature. In an embodiment, the primary drying for such an ink may be omitted. Thus, the primary drying is prevented from causing the inks to dry at the nozzles, suppressing clogging. Furthermore, such an ink can be consistently ejected without ink droplets deviating from proper ejection paths and can form images resistant to rubbing.

The normal boiling point of the organic solvent may be 180° C. or more, for example, 200° C. or more or 210° C. or more. Also, the normal boiling point of the organic solvent may be 300° C. or less, for example, 280° C. or less, 270° C. or less, or 250° C. or less. Ink compositions containing an organic solvent having such a normal boiling point can be consistently ejected and produce printed items resistant to rubbing.

Polyols having a normal boiling point of more than 280° C., such as triethylene glycol and glycerin, act as a moisturizing agent. Accordingly, the ink composition containing such a polyol is beneficial in reducing the drying of the ink jet head and thus for consistent ejection. However, polyols having a normal boiling point of more than 280° C. may absorb water from the ink composition, increasing the viscosity of the ink composition around the ink jet head and making the ink unlikely to dry when applied onto the printing medium. Accordingly, it is beneficial to limit the polyol content having a normal boiling point of more than 280° C. in the ink composition to 3% or less, for example, 2% or less or 1% or less, relative to the total mass of the ink composition. In some embodiments, the content of such a polyol may be limited to 0.8% by mass or less or 0.1% by mass or less. Such an ink composition can dry rapidly on the printing medium and is accordingly suitable to print images on poorly absorbent printing media or non-absorbent printing media and can produce images resistant to rubbing.

From the same viewpoint, in addition, it is beneficial to control the content of organic solvent having a normal boiling point of more than 280° C. in the above-described range. The organic solvent having a normal boiling point of more than 280° C. is not limited to polyols.

1. 2. 4. Resin

In some embodiments, the inks may contain a resin. The resin solidifies the ink and firmly fixes the solidified ink to the printing medium. The resin may be dissolved or dispersed in the ink composition. For the resin dissolved in the ink, any one of the resins cited as the dispersant used for dispersing the pigment in the ink may be used. The resin in the form of dispersion may be an emulsion or a suspension. The emulsion or the suspension may be prepared by dispersing fine particles of a resin that is insoluble or poorly soluble in the liquid medium of the ink.

Examples of the resin used in the ink compositions include, but are not limited to, acrylic resin, vinyl acetate resin, polyvinyl chloride resin, butadiene resin, styrene resin, polyester resin, crosslinked acrylic resin, crosslinked styrene resin, benzoguanamine resin, phenol resin, silicone resin, epoxy resin, urethane resin, paraffin resin, fluororesin, and water-soluble resin and copolymers of monomers forming these resins. Examples of the copolymers include, but are not limited to, styrene-butadiene resin, styrene-acrylic resin, polyether polyurethane resin, and polyester polyurethane resin. A polymer latex containing one or more of these resins may be used as the resin. For example, a polymer latex containing fine particles of a resin, such as acrylic resin, styrene resin, crosslinked acrylic resin, crosslinked styrene resin, or urethane resin, may be used. Such a resin may be used individually, or two or more resins may be used in combination.

Acrylic resin is a homopolymer or a copolymer formed by polymerizing one or more acrylic monomers. Acrylic monomers include (meth)acrylates, (meth)acrylic acid, acrylamide, and acrylonitrile. The acrylic resin in a copolymer form may be an acrylic-vinyl resin that is formed by using a vinyl monomer as the other monomer, for example, a styrene-acrylic resin formed by using styrene as the vinyl monomer. Acrylic resin, urethane resin, and polyester resin are more available than other resins and beneficial in obtaining a resin having desired properties. In the description disclosed herein, copolymers having a urethane structure, polymerized by using at least an acrylic monomer are treated as urethane resin.

In particular, it is beneficial for the non-white ink compositions to contain a urethane resin as the resin. Since urethane resin increases the adhesion of the ink to the printing medium, the resulting images are resistant to rubbing.

The lower limit of the resin solid content may be 1% or more, for example, 2% or more or 3% or more, relative to the total mass of the ink composition. The upper limit of the resin solid content may be 15% or less, for example, 10% or less or 7% or less, relative to the total mass of the ink composition. The ink compositions containing a resin with such a content are unlikely to cause clogging and can form images resistant to rubbing even on a poorly ink-absorbent or ink-non-absorbent printing medium.

1. 2. 5. Surfactant

In some embodiments, the inks may contain a surfactant. Examples of the surfactant include, but are not limited to, acetylene glycol-based surfactants, fluorosurfactants, and silicone surfactants. The inks may contain at least one of these surfactants, particularly, a silicone surfactant. The silicone surfactant in an ink reduces the dynamic surface tension of the ink and prevents the ink droplets from deviating from the proper ejection paths.

Examples of the acetylene glycol-based surfactant include, but are not limited to, SURFYNOL series 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all produced by Air Products and Chemicals); OLFINE series B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all produced by Nissin Chemical Industry); and ACETYLENOL series E00, E00P, E40, and E100 (all produced by Kawaken Fine Chemicals).

The silicone surfactant may be, but is not limited to, a polysiloxane-based compound. For example, a polyether-modified organosiloxane may be used as the polysiloxane-based compound. Polyether-modified organosiloxanes are commercially available, and examples thereof include BYK-306, BYK-307, BYK-333, BYK-341, BYK-345, BYK-346, and BYK-348 (all produced by BYK Additives & Instruments); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all produced by Shin-Etsu Chemical).

The fluorosurfactant used in the ink composition may be a fluorine-modified polymer, such as BYK-340 (produced by BYK Additives & Instruments).

The content of surfactant, if added, may be 0.1% to 1.5%, for example, 0.5% to 1%, relative to the total mass of the ink composition.

1. 2. 6. Wax

In some embodiments, the inks may contain a wax. The wax may be dissolved in the ink composition or may be in the form of emulsion in which fine particles thereof are dispersed. The use of such a wax tends to increase the rub resistance of the printed item. In particular, the wax tends to be present at the surface of the ink coating, that is, at the interface between the air and the coating, on the printing medium, thus contributing to increasing rub resistance. However, the wax may interfere with the adhesion of the coating to the laminating film. The wax may be, but is not limited to, an ester wax made up of a higher fatty acid and a higher monohydric or dihydric alcohol, a paraffin wax, a microcrystalline wax, an olefin wax, or a mixture thereof.

The polyolefin wax may be a wax produced from an olefin, such as ethylene, propylene, and butylene, or a derivative thereof or a copolymer of such a wax, and examples of the polyolefin wax include polyethylene waxes, polypropylene waxes, and polybutylene waxes. A commercially available polyolefin wax may be used, and examples thereof include NOPCOTE PEM 17 (produced by San Nopco), CHEMIPEARL W4005 (produced by Mitsui Chemicals), and AQUACER 515 and AQUACER 593 (both produced by BYK Additives & Instruments).

For the clear ink composition, the wax content may be 3% or less, for example, 2% or less, 1% or less, or 0.5%, relative to the total mass of the clear ink composition. The lower limit is 0% by mass. In an embodiment, the wax content may be 0.1% or more. The clear ink composition containing a wax in such a range contributes to increasing the resistance to rubbing and laminate peeling of the printed item.

Either the non-white ink composition or the white ink composition also contains a wax, and the wax content in the clear ink composition may be equal to that in the ink compositions. In some embodiments, the wax content in the clear ink composition is twice or more, for example, three times or more or four times or more, as high as that in the non-white or white ink composition. In this instance, the wax content in the clear ink composition relative to the wax content in the non-white or white ink composition may be, but is not limited to, 10 times or less, 8 times or less, or 6 times or less. When the wax content in the clear ink composition is in such a range, the clear ink coating film can be resistant to rubbing and can tightly adhere to the laminating film.

For the non-white ink composition and the white ink composition, the wax content may be 2% or less relative to the total mass of the ink composition. In some embodiments, the wax content may be, by mass, 0.2% to 1% or 0.3% to 0.5%. The lower limit is 0% by mass. The wax content may be 0.1% or more. The non-white and white inks containing a wax in such a range can form an adhesive and rub-resistant coating.

1. 2. 7. Antifoaming Agent

The ink compositions may contain an antifoaming agent, and examples thereof include, but are not limited to, silicone antifoaming agents, polyether antifoaming agents, fatty acid ester antifoaming agents, and acetylene glycol antifoaming agents. The antifoaming agent is commercially available, and examples thereof include BYK-011, BYK-012, BYK-017, BYK-018, BYK-019, BYK-020, BYK-021, BYK-022, BYK-023, BYK-024, BYK-025, BYK-028, BYK-038, BYK-044, BYK-080A, BYK-094, BYK-1610, BYK-1615, BYK-1650, BYK-1730, and BYK-1770 (all produced by BYK Additives & Instruments); and Surfynol series DF37, DF110D, DF58, DF75, DF220, MD-20, and Enviro Gem AD01 (all produced by Evonik Industries). Such antifoaming agents may be used individually or in combination.

The antifoaming agent content may be 0.03% to 0.7%, for example, 0.05% to 0.5% or 0.08% to 0.3%, relative to the total mass of the ink composition.

1. 2. 8. Other Constituents

The ink compositions disclosed herein may optionally contain a solubilizing agent, a viscosity modifier, a pH adjuster, an antioxidant, a preservative, an antifungal agent, a corrosion inhibitor, a moisturizing agent that does not act as an organic solvent, and a chelating agent for capturing metal ions affecting dispersion, and other additives, from the viewpoint of maintaining stabile preservation and consistent ejection from the ink jet head, suppressing clogging, and preventing deterioration.

1. 2. 9. Preparation of Ink Compositions

The ink compositions disclosed herein are prepared by mixing the above-described constituents in a desired order and, optionally, removing impurities by, for example, filtration. For mixing the constituents, for example, the constituents may be added one after another into a container equipped with a stirring device, such as a mechanical stirrer or a magnetic stirrer, and the contents of the container are stirred. Filtration may be performed as required by, for example, centrifugal filtration or using a filter paper.

1. 2. 10. Properties of Ink Compositions

In some embodiments of the present disclosure, the ink compositions have a surface tension (static surface tension) of 18 mN/m to 40 mN/m at 20° C. from the viewpoint of the balance between the quality of the printed image and the reliability of the ink composition as an ink jet ink. Beneficially, the surface tension is 20 mN/m to 35 mN/m or 22 mN/m to 33 mN/m. The surface tension can be determined by measuring the ink composition wetting a platinum plate at 20° C. with, for example, an automatic surface tensiometer CBVP-Z (manufactured by Kyowa Interface Science).

Also, the viscosity of the ink compositions may be 3 mPa·s to 10 mPa·s at 20° C., for example, 3 mPa·s to 8 mPa·s, from the viewpoint of the balance between the quality of the printed image and the reliability of the ink composition as an ink jet ink. The viscosity can be measured at 20° C. with, for example, a viscoelasticity meter MCR-300 (manufactured by Pysica).

1. 3. Treatment Liquid

In an embodiment, the following treatment liquid may be used.

The treatment liquid is a composition capable of flocculating one or more constituents of the inks and contains a flocculant capable of favorably flocculating one or more constituents in the inks. The treatment liquid reacts with the coloring material, the resin, or the like contained in the inks. The coloring material content in the treatment liquid may be, by mass, 0.2% or less, for example, 0.1% or less or 0.05% or less. The lower limit of the coloring material content is 0% by mass. Unlike the above-described non-white ink, the treatment liquid is not an ink used to color the printing medium and is an aid that is applied onto the printing medium before or simultaneously with applying the non-white ink. In addition, the treatment liquid is not the clear ink described above.

The treatment liquid may contain other constituents in a desired proportion and have any properties, independent of the ink compositions, provided that it contains a flocculant. The treatment liquid is effective in printing high-quality images. However, the use of the treatment liquid may lead to a reduced rub resistance and adhesion to the laminating film.

1. 3. 1. Flocculant

The treatment liquid that may be used in the printing method disclosed herein contains a flocculant capable of flocculating one or more components of the ink compositions. The flocculant in the treatment liquid reacts rapidly with the coloring material, the resin, and the like in the ink compositions in the ink application steps described later herein. Thus, the coloring material and the resin dispersed in the ink compositions are flocculated. The flocculant inhibits the coloring material from penetrating the printing medium, thus improving the image quality of the printed image.

The flocculant may be a multivalent metal salt, a cationic compound, such as a cationic resin or a cationic surfactant, or an organic acid. Such flocculants may be used individually or in combination. In some embodiments, the flocculant may be at least one selected from the group consisting of multivalent metal salts, organic acids, and cationic resins. such compounds are highly reactive with the constituents in the ink compositions.

The multivalent metal salt may be a water-soluble compound composed of a divalent or higher-valent metal ion and an anion capable of binding to the metal ion. Examples of the multivalent metal ion include divalent metal ions, such as $Ca^{2+}$, $Cu^{2+}$, $Ni^{2+}$, $Mg^{2+}$, $Zn^{2+}$, and $Ba^{2+}$; and trivalent metal ions, such as $Al^{3+}$, $Fe^{3+}$, and $Cr^{3+}$. Examples of the anion include $Cl^-$, $I^-$, $Br^-$, $SO_4^{2-}$, $ClO_3^-$, $NO_3^-$, $HCOO^-$, and $CH_3COO^-$. Calcium salts and magnesium salts are beneficial in terms of stability of the treatment liquid and reactivity of the treatment liquid as the flocculant.

Examples of the organic acid include phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furancarboxylic acid, pyridinecarboxylic acid, coumaric acid, thiophenecarboxylic acid, nicotinic acid, and derivatives or salts of these acids. Such organic acids may be used individually or in combination. Organic acid salts of polyvalent metals belong to the category of the above-described polyvalent metal salts.

Examples of the cationic resin include cationic urethane resin, cationic olefin resin, and cationic amine-based resin. The cationic amine-based resin has an amino group, and examples thereof include allylamine resin, polyamine resin, quaternary ammonium salt polymer, and polyamide resin. The polyamine resin may be a resin having an amino group in the main skeleton of the resin. The allylamine resin may be a resin having a structure derived from the allyl group in the main skeleton of the resin. The quaternary ammonium salt polymer may be a resin having a quaternary ammonium salt in the structure thereof. The polyamide resin may be a resin having an amide group in the main skeleton of the resin and an amino group in a side chain of the resin. In some embodiments, a cationic amine-based resin may be used. Cationic amine-based resins are more reactive and available than other cationic resins.

The flocculant content in the treatment liquid may be 0.5% or more, for example, 1% or more or 3% or more, relative to the total mass of the treatment liquid. Also, the flocculant content in the treatment liquid may be 20% or less, for example, 15% or less or 10% or less, relative to the total mass of the treatment liquid.

1. 3. 2. Water

In some embodiments, the treatment liquid may be an aqueous composition containing water as a major solvent. The water will be evaporated by drying after the treatment liquid is applied onto the printing medium. The water may be pure water or ultra-pure water from which ionic impurities have been removed as much as possible. Examples of such water include ion exchanged water, ultrafiltered water, reverse osmosis water, and distilled water. Sterile water prepared by, for example, UV irradiation or addition of hydrogen peroxide is beneficial. The use of sterile water can prevent, for a long period, the occurrence of mold or bacteria in the treatment liquid. The water content in the treatment liquid may be 40% or more relative to the total mass of the treatment liquid and is, for example, 50% or more, 60% or more, or 70% or more. The upper limit of the water content may be, but is not limited to, for example, 99% by mass or less.

1. 3. 3. Organic Solvent

The treatment liquid may contain an organic solvent. By adding an organic solvent, the wettability of the treatment liquid on the printing medium can be increased. The organic solvent may be selected from the organic solvents cited as those used in the ink compositions. The organic solvent content may be, but is not limited to, 10% to 80%, for example, 15% to 70%, relative to the total mass of the treatment liquid.

The normal boiling point of the organic solvent used in the treatment liquid may be in the range described for the organic solvent that can be used in the ink compositions, and the organic solvent may be selected independently of the organic solvent used in the ink compositions. Alternatively, the normal boiling point of the organic solvent used in the treatment liquid may be 180° C. or more, for example, 190° C. or more or 200° C. or more. Also, the normal boiling point of the organic solvent may be 300° C. or less, for example, 280° C. or less, 270° C. or less, or 250° C. or less.

As with the ink composition, the treatment liquid may contain a polyol having a normal boiling point of 280° C. or more or a water-soluble organic solvent having a normal boiling point of 280° C. or more as the organic solvent. The content of such an organic solvent may be, by mass, 5% or less, for example, 3% or less, 2% or less, or 1% or less. In some embodiments, it may be 0.8% or less or 0.1% or less. Such a treatment liquid can dry readily. Accordingly, the resulting printed items are unlikely to be sticky and have high resistance to rubbing.

1. 3. 4. Surfactant

The treatment liquid may contain a surfactant. By adding a surfactant, the surface tension of the treatment liquid can be reduced, and accordingly, the wettability of the treatment liquid on the printing medium can be increased. In some embodiments, an acetylene glycol-based surfactant, a silicone surfactant, or a fluorosurfactant may be selected from among the surfactants. Examples of the surfactant that may be used in the treatment liquid are the same as those cited for the ink compositions. The surfactant content may be, but is not limited to, 0.1% to 5% relative to the total mass of the treatment liquid.

1. 3. 5. Other Constituents

The treatment liquid used in the printing method disclosed herein may optionally contain a pH adjuster, a preservative or fungicide, a rust preventive, a chelating agent, and other additives, as described above.

1. 3. 6. Preparation of Treatment Liquid

The treatment liquid used in the printing method disclosed herein may be prepared by mixing and dispersing the above-described constituents in an appropriate manner. After sufficiently stirring the mixture, foreign matter and coarse particles that may cause clogging are removed through a filter to yield a desired treatment liquid.

1. 3. 7. Physical Properties of Treatment Liquid

In some embodiments, the treatment liquid is ejected from an ink jet head. In this instance, the treatment liquid may have a surface tension of 18 mN/m to 40 mN/m 25° C., for example, 20 mN/m to 35 mN/m, or 22 mN/m to 33 mN/m. The surface tension may be determined by measuring the treatment liquid wetting a platinum plate at 25° C. with, for example, an automatic surface tensiometer CBVP-Z (product name, manufactured by Kyowa Interface Science).

In addition, from the same viewpoint as just mentioned, the viscosity of the treatment liquid at 25° C. may be 3 mPa·s to 10 mPa·s, for example, 3 mPa·s to 8 mPa·s. The viscosity can be measured at 25° C. with, for example, a viscoelasticity meter MCR-300 (manufactured by Pysica).

1. 4. Printing Medium

In an embodiment of the printing method disclosed herein, printed items including high-quality images with high opacity and laminate peel resistance can be produced by printing a poorly ink-absorbent or ink-non-absorbent printing medium.

The printing medium may be absorbent, poorly absorbent, or not absorbent.

A poorly absorbent or non-absorbent printing medium mentioned herein is such that the printing surface of the medium absorbs water at a rate of 10 mL/m$^2$ or less for a period of 30 ms from the beginning of contact with water when measured by the Bristow method. The Bristow method is most broadly used for measuring liquid absorption in a short time, and Japan Technical Association of the Pulp and Paper Industry (JAPAN TAPPI) officially adopts this method. Details of this method are specified in Standard No. 51 (Paper and Paperboard—Liquid Absorption Test Method—Bristow's Method (in Japanese)) of JAPAN TAPPI Paper and Pulp Test Methods edited in 2000 (in Japanese).

Non-absorbent and poorly absorbent media may be classified by the wettability of water on the printing surface thereof. For example, printing media may be characterized by measuring the rate of decrease in the contact angle of 0.5 µL of water dropped on the printing surface of the printing medium (comparing the contact angle 0.5 ms after landing with the contact angle 5 s after landing). More specifically, non-absorbent printing media refer to those exhibiting a contact angle decreasing rate of less than 1%, and poorly absorbent printing media refer to those exhibiting a contact angle decreasing rate in the range of 1% to less than 5%. Absorbent media refer to those exhibiting a contact angle decreasing rate of 5% or more. The contact angle can be measured with, for example, a portable contact angle meter PCA-1 (manufactured by Kyowa Interface Science).

Absorbent printing media include, but are not limited to, plain paper, such as electrophotographic paper having high permeability to ink compositions; ink jet paper having an ink-absorbent layer containing silica particles or alumina particles or an ink-absorbent layer made of a hydrophilic polymer, such as polyvinyl alcohol (PVA) or polyvinyl pyrrolidone (PVP); and art paper, coat paper, and cast-coated paper that are used for ordinary offset printing and have relatively low permeability to ink.

The poorly absorbent printing medium may be, but is not limited to, coated paper including a coating layer at the surface thereof for receiving oil-based ink. The coated paper may be, but is not limited to, book-printing paper, such as art paper, coat paper, or matte paper.

The non-absorbent printing medium may be, but is not limited to, a plastic film not provided with an ink-absorbent layer, or a paper sheet or any other base material coated or bonded with a plastic film. The plastic used for the printing medium may be polyvinyl chloride, polyethylene terephthalate, polycarbonate, polystyrene, polyurethane, polyethylene, or polypropylene.

Polyolefins, such as polyethylene and polypropylene, are flexible and, accordingly, useful as a packaging film. Even though the printing medium is such a polyolefin film, however, printed items are often laminated before use, as described later herein, to protect the printed side. Some embodiments of the present disclosure are beneficial in such a case.

The printing medium may be an ink-non-absorbent or poorly ink-absorbent plate made of a metal, such as iron, silver, copper, or aluminum, or glass.

The printing medium may be translucent or transparent.

Also, the printing medium may be in the form of a roll. Rolled printing media may be printed in such a manner that the printing medium is scanned by an ink jet head and wound on a take-up roller. Ink coatings printed on rolled printing media often peel off the media before lamination if the white ink coating is not much resistant to rubbing. However, the printed item produced in the printing method disclosed herein is resistant to rubbing and lamination because of the presence of the clear ink coating.

The thickness of the printing medium used in the printing method disclosed herein may be 5 µm to 70 µm, for example, 10 µm to 60 µm or 15 µm to 50 µm. In the printing method disclosed herein, when a printing medium having such a thickness is printed, the clear ink coating enhances the resistance to rubbing and lamination of the printed item produced by printing the printing medium having such a thickness.

2. PRINTING METHOD

The printing method disclosed herein is a method for printing a printing medium. For example, in the printing method, the ink jet printing apparatus 1 having ink jet line heads having a dimension larger than the width of the printing medium is used, and the printing is performed by ejecting inks from the ink jet line heads to print one entire line of an image by one scanning motion. In some embodiments, one-pass printing may be used which can print one entire line of an image by one scanning motion. The scanning motion in this instance is such that the treatment liquid and the ink compositions are ejected onto a rolled printing medium F from the respective applying sections. In an embodiment, however, printed items may be produced by serial printing.

The printing method disclosed herein includes a non-white ink application step, a white ink application step, and a clear ink application step and may optionally include a treatment liquid application step and a primary and a secondary heating step.

2. 1. Treatment Liquid Application Step

In the treatment liquid application step, the treatment liquid is applied from the treatment liquid applying section 31 onto the printing medium. By applying the treatment liquid onto the printing medium, the rub resistance and the image quality of the printing image are increased.

The treatment liquid may be applied before or simultaneously with the application of the ink compositions. In an embodiment using the ink jet printing apparatus 1 depicted in FIG. 1, the treatment liquid application step is performed before the ink application steps described later herein.

When the treatment liquid is applied, the printed region may include a portion where the treatment liquid is applied in a proportion of 1% to 10%, for example, 1.5% to 8% or 2% to 6%, relative to the total mass of the inks applied to that portion. When the treatment liquid is applied in such a proportion, more high-quality images can be formed, while the resistance to rubbing and laminate peeling are prevented from decreasing.

The surface temperature of the printing medium F when the treatment liquid is applied thereto may be set in the range of the surface temperature favorable for applying the inks but may be set independent of the temperature when the inks are applied. For example, the surface temperature of the printing medium F when the treatment liquid is applied thereto may be 45° C. or less, for example, 40° C. or less or 38° C. or less. The lower limit of the surface temperature of the printing medium F at this time may be 20° C. or more, for example, 25° C. or more or 30° C. or more. When the surface temperature of the printing medium F is in such a range, the treatment liquid can be uniformly applied onto the printing medium F, resulting in increased laminate peel resistance, rub resistance, and image quality. In addition, the impact of heat on the ink jet heads is reduced.

Figure 2:
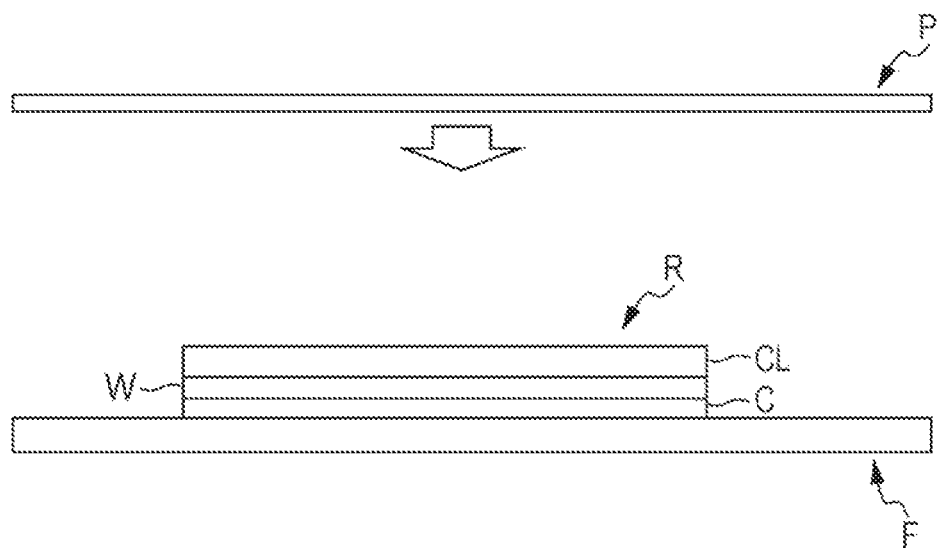
FIG. 2 is an illustrative representation of a printed item produced in an embodiment of the present disclosure.

2. 2. Non-White Ink Application Step, White Ink Application Step, and Clear Ink Application Step In the ink application steps, the non-white ink applying sections 32, the white ink applying section 33, and the clear ink applying section 34 eject the respective inks onto the printing medium F, thus forming an image on the surface of the printing medium F. In these steps, the white ink is applied onto the printing medium F onto which the non-white inks have been applied, as illustrated in FIGS. 1 and 2. This is referred to as the rear side printing mode. A white ink coating W thus formed over a non-white ink coating C functions as the background of the non-white ink coating C when the resulting image is viewed through the printing medium F, hiding the non-white ink coating C so that the non-white ink coating C cannot be seen through the white ink coating W. Consequently, the non-white ink coating C is highly visible from the opposite side. Also, when the printed image is viewed from the proper side, the printing medium F comes closer than the non-white ink coating C to the viewer, thus strongly protecting the image.

The maximum application rate of the non-white ink compositions applied to a unit area of the printing medium F is not particularly limited provided that the total application rate is in the above-described range. For example, the maximum application rate of the non-white ink compositions may be 4 mg/inch$^2$ or more, 6 mg/inch$^2$ or more, or 8 mg/inch$^2$ or more. Also, the upper limit of the application rate of the non-white ink composition may be, but is not limited to, 20 mg/inch$^2$ or less, 15 mg/inch$^2$ or less, or 12 mg/inch$^2$ or less. By applying the non-white ink composition in such a rate, the image quality of the resulting printed item is increased. The maximum application rate of ink compositions is the total amount of the inks applied to a unit area one on another.

The maximum amount of the white ink composition applied onto a unit area of the printing medium F (the maximum application rate of the white ink composition) may be 8 mg/inch$^2$ or more, for example, 10 mg/inch$^2$ or more or 12 mg/inch$^2$ or more. Also, the upper limit of the application rate of the white ink composition may be, but is not limited to, 30 mg/inch$^2$ or less, 25 mg/inch$^2$ or less, or 20 mg/inch$^2$ or less. By applying the white ink composition in such a rate, the opacity of the resulting printed item is increased. The maximum application rate of ink compositions is the total amount of the inks applied to a unit area one on another.

The maximum amount of the clear ink composition applied onto a unit area of the printing medium F (the maximum application rate of the clear ink composition) may be 0.5 mg/inch$^2$ or more, for example, 0.8 mg/inch$^2$ or more or mg/inch$^2$ or more. Also, the upper limit of the application rate of the clear ink composition may be, but is not limited to, 6 mg/inch$^2$ or less, 5 mg/inch$^2$ or less, or 4 mg/inch$^2$ or less. By applying the clear ink composition in such a rate, the resistance to rubbing and laminate peeling of the resulting printed item is increased. The maximum application rate of ink compositions is the total amount of the inks applied to a unit area one on another and is represented on a mass basis. The application rate of an ink refers to the amount (mass) per unit area of the ink applied to a region having a specific area or more of the printing medium. For example, the application rate may be the mass of the ink applied to a printing region having an area of 1 mm×1 mm (=1 mm$^2$). The application rate of each of the inks and the treatment liquid is controlled by a control unit of the ink jet printing apparatus that controls the printing section when printing is performed.

The printing method may include a primary drying step of heating the printing medium F with the first dryer or the drying device 100 before or simultaneously with the ink application steps. In some embodiments, the ink compositions are applied to the printing medium heated in the heating step. By heating the printing medium F, the treatment liquid and the inks are rapidly dried on the printing medium, thus increasing adhesion and reducing bleeding. In addition, the resulting image exhibits sufficient rub resistance and high image quality.

The surface temperature of the printing medium during the ink application steps has already been described. The printing method may or may not include the primary drying step. In some embodiments, the primary drying is omitted.

The upper limit of the nozzle face temperature when ink is applied onto the printing medium F in the ink application steps, that is, the maximum temperature of the nozzle face during printing, may be 55° C. or less, for example, 50° C. or less, 45° C. or less, or 40° C. or less. By controlling the nozzle face temperature to such a level when ink is applied, the impact of heat on the ink jet head is reduced to prevent the ink jet head or nozzles from being clogged. The lower limit of the nozzle face temperature during ink jet printing may be room temperature or higher than room temperature. More specifically, the lower limit of the nozzle face temperature may be 20° C. or more, for example, 28° C. or more, 30° C. or more, or 32° C. or more. By controlling the nozzle face temperature in such a range during ink jet printing, the ink on the printing medium F can be rapidly dried and solidified, thus reducing bleeding, and the resulting image can be resistant to rubbing and have high image quality. The nozzle face temperature when the inks are applied onto the printing medium F may be the temperature increased by the heat at the surface of the printing medium or the heat generated from the ink jet head.

In the printing method disclosed herein, the ink application steps may be performed on the printing medium fed at a speed of 15 m/min or more. In some embodiments of the printing method disclosed herein, the organic solvent content of the inks and the amount of the inks applied are appropriately controlled, and the treatment liquid may be used. Such a printing method can produce printed items resistant to laminate peeling and rubbing and having high image quality even though the printing medium is fed at a speed of 15 m/min or more. The printing medium may be fed at a speed of 20 m/min or more or 23 m/min or more and also at a speed of 50 m/min or less, 40 m/min or less, or 30 m/min.

2. 3. Post-Application Drying Step

The ink jet printing method disclosed herein may optionally include a post-application drying step (often referred to as secondary heating step) of heating the printing medium F with the second dryer 50 depicted in FIG. 1 after the ink application steps. Thus, the resin or the like in the ink compositions on the printing medium F is melted to form an ink film and solidified to be firmly fixed to the printing medium F, thus forming a high-quality image resistant to rubbing in a short time.

The upper limit of the surface temperature of the printing medium F heated by the second dryer 50 may be 120° C. or less, for example, 110° C. or less or 100° C. or less. Also, the lower limit of the surface temperature of the printing medium F at this time may be 60° C. or more, for example, 70° C. or more or 80° C. or more. By controlling the surface temperature in such a range, high-quality images resistant to rubbing and laminate peeling can be formed in a short time, and the inks are consistently ejected.

2. 4. Other Steps

The printing method disclosed herein may include a cleaning step of discharging the ink compositions and the treatment liquid with a mechanism other than a pressure generator configured to eject the inks for printing, that is, other than the ink ejection mechanism of the ink jet heads.

The ink ejection mechanism included in the respective ink jet heads may be a piezoelectric element or a heater element that is operable to apply a pressure to the ink and is disposed in a pressure generating chamber (not shown). The cleaning step may be performed by applying an external pressure to the ink jet heads to discharge the ink compositions and the treatment liquid from the nozzles. This cleaning step reduces the risk of the resin melting and adhering to the inner wall of the ink jet heads, thus helping consistent ejection of the inks.

In an embodiment, the cleaning may be performed by using a mechanism configured to apply a pressure, for example, to apply a negative pressure or apply a positive pressure from upstream of the ink jet head. The discharge of the inks and the treatment liquid is not the discharge by a function of the ink jet head itself, that is, by flushing. Hence, the discharge is not the operation performed by using a function to eject ink from the ink jet head.

2. 5. Lamination Step

In an embodiment of the printing method of the present disclosure, the resulting printed item may be as depicted in FIG. 2. FIG. 2 is an illustrative representation of a printed item produced in an embodiment of the printing method of the present disclosure. As depicted in FIG. 2, a printed item R includes a non-white ink coating C formed on a printing medium F, a white ink coating W formed over the non-white ink coating C, and a clear ink coating CL formed over the white ink coating W. The printed item R can be used for some information display or the like as it is.

In an embodiment, however, the clear ink coating CL that defines the printed side of the printed item may be laminated before use. This is because the clear ink coating CL is easy to laminate and resistant to laminate peeling. More specifically, the printed item produced by the printing method of an embodiment of the present disclosure may be used for manufacturing a laminated film.

The printed side covered with the clear ink coating CL is protected from flaws formed when coming into contact with something hard before lamination. In some embodiments, the clear ink coating CL may contain a wax from the viewpoint of increasing rub resistance.

The laminated film may be manufactured by, for example, covering the printed side of the printed item with a protective film P in a direction indicated by the arrow depicted in FIG. 2. The lamination may be performed as, but not limited to, follows: a protective film, or laminating film, and the printed side of a printed item may be pasted together after a known adhesive is applied onto the printed side, or the protective film with an adhesive applied thereto and the printed side of the printed item may be pasted together. Alternatively, a melted resin of a protective film may be extruded onto the printed side of the printed item to form a film over the printed side.

The laminating film used for the lamination may be a resin film. Laminated printed items are resistant to light and rubbing and are protected from the impact of solid objects or severe handling. The laminated printed item may be further heated or pressed at room temperature for sufficient adhesion. In an embodiment, a plastic that can be used as the material of the printing medium may be used as a laminating film. In this instance, the same material as that of the printing medium may be used as the laminating film.

3. EXAMPLES

The subject matter of the present disclosure will be further described in detail with reference to Examples and Comparative Examples, but it is not limited to the Examples.

3. 1. Preparation of Treatment Liquids and Inks

Constituents for any of the treatment liquids and inks were mixed with the proportions presented in Tables 1 and 2 and stirred, and the mixture was filtered through a membrane filter of 5 μm in pore size. Thus, treatment liquids OP1 to OP3, non-white inks C1 to C3, white inks W1 to W5, and clear inks CL1 to CL4 were prepared. In the preparation of each ink, 0.5 part by mass of water-soluble styrene-acrylic resin was mixed as a dispersant (not presented in the Tables) relative to 1 part by mass of pigment. The mixture was agitated in a bead mill to yields a pigment dispersion liquid used in the ink. Each value in Tables 1 and 2 represents the content of the corresponding constituent on a percent-by-mass basis, and ion exchanged water was added so that the total of the composition came to 100% by mass. The content for the pigments and the resins presented in Table 2 are represented in terms of solid content. For the non-white inks, for example, four inks C1 varying in color having the same composition except the pigment were prepared, in which any one of the black, cyan, magenta, and yellow pigments presented herein later was used. Thus, four inks were prepared for each of the ink groups represented by C1 to C3.

TABLE 1

|  |  | OP1 | OP2 | OP3 |
|---|---|---|---|---|
| Organic solvent | 1,2-Hexanediol (Boiling point: 223° C.) | 4 | 4 | 4 |
| Flocculant | Calcium acetate monohydrate | 15 |  |  |
|  | Acetic acid |  | 15 |  |
|  | Catiomaster PD-7 (solids) |  |  | 15 |
| Antifoaming agent | DF110D | 0.1 | 0.1 | 0.1 |
| Surfactant | BYK-348 | 2 | 2 | 2 |
| Pure water |  | Balance | Balance | Balance |
| Total |  | 100 | 100 | 100 |

The constituents presented in Tables 1 and 2 are as follows:

Flocculant
Catiomaster PD-7: amine-epichlorohydrin condensation polymer, produced by Yokkaichi Chemical Antifoaming Agent
DF110D: SURFYNOL DF110D, acetylenediol-based surfactant, produced by Evonik Industries
Surfactant
BYK-348: silicone surfactant produced by BYK Additives & Instruments
Pigments
Black pigment: Carbon black
Cyan pigment: C. I. Pigment Blue 15:3
Magenta Pigment: C. I. Pigment Red 122
Yellow pigment: C. I. Pigment Yellow 155
White pigment: C. I. Pigment White 6
Resin
TAKELAC WS-6061 (urethane resin emulsion, produced by Mitsui Chemicals)
JONCRYL 62J (styrene-acrylic resin emulsion, produced by BASF)
AQUACER 539 (modified paraffin wax emulsion for aqueous system, produced by BYK Additives & Instruments 3. 2. Printing Method Printing was performed by using the treatment liquids presented in Table 1 and the inks presented in Table 2. The printing apparatus was prepared by providing an ink jet printer, model L-6034VW, manufactured by Seiko Epson with a drying heater. This printer was configured for one-pass printing performed in such a manner that the printing medium was continuously fed with the heads fixed in position during printing. Although the printer was capable of using a platen heater, the platen heater was not operated for

TABLE 2

|  |  | C1 | C2 | C3 | W1 | W2 | W3 | W4 | W5 | CL1 | CL2 | CL3 | CL4 |
|---|---|---|---|---|---|---|---|---|---|---|---|---|---|
| Organic solvent | Propylene glycol (Boiling point: 188° C.) |  | 15 |  |  | 15 |  |  |  |  |  |  |  |
|  | 2-Pyrrolidone (Boiling point: 245° C.) |  | 4 |  |  | 4 |  |  |  |  |  |  |  |
|  | 1,2-Hexanediol (Boiling point: 223° C.) | 4 | 4 | 4 | 4 | 4 | 4 | 4 | 4 | 4 | 4 | 4 | 4 |
| Pigment dispersion liquid | Color pigment dispersion liquid (solids)* | 3 | 3 | 3 |  |  |  |  |  |  |  |  |  |
|  | White pigment dispersion liquid (solids) |  |  |  | 10 | 10 | 10 | 10 | 7 |  |  |  |  |
| Resin | TAKELAC W-6061 | 1 | 1 |  | 1 | 1 |  | 1 | 1 | 2 | 2 | 2 | 2 |
|  | JONCRYL 62J |  |  | 1 |  |  | 1 |  |  |  |  |  |  |
| Wax | AQUACER539 | 0.5 | 0.5 | 0.5 | 0.5 | 0.5 | 0.5 |  | 0.5 | 2 | 3.5 | 0.5 |  |
| Antifoaming agent | SURFYNOL DF110D | 0.1 | 0.1 | 0.1 | 0.1 | 0.1 | 0.1 | 0.1 | 0.1 | 0.1 | 0.1 | 0.1 | 0.1 |
| Surfactant | BYK348 | 1 | 1 | 1 | 1 | 1 | 1 | 1 | 1 | 1 | 1 | 1 | 1 |
| Pure water |  | Balance | Balance | Balance | Balance | Balance | Balance | Balance | Balance | Balance | Balance | Balance | Balance |
| Total |  | 100 | 100 | 100 | 100 | 100 | 100 | 100 | 100 | 100 | 100 | 100 | 100 |
| Total organic solvent content |  | 4 | 23 | 4 | 4 | 23 | 4 | 4 | 4 | 4 | 4 | 4 | 4 | primary heating during printing in the Examples. The surface temperature of the printing medium opposing the heads, that is, the highest temperature during printing, was set to 25° C., while the highest temperature downstream from the heads was increased to 70° C. by a secondary drying mechanism for drying. An infrared (IR) heater or a thermal conduction heater was used as the secondary drying mechanism, and the temperature of the printing medium was measured with a thermocouple.

The line printer was configured as illustrated in FIG. 1. For the white ink, either the head 31 upstream from the heads 32 for non-white inks or the head 33 downstream from the heads 32. In Tables 3 and 4, "white first" in the row presenting the application order means the white ink was located upstream, and "white last" means that the white ink was located downstream for the rear side printing mode.

For the non-white inks, black, cyan, magenta, and yellow inks were placed individually in this order into the four non-white ink heads 32. The application rate of the non-white inks was the total amount per unit area of the four inks evenly applied. The clear ink head 34 was disposed most downstream for finally applying the clear. In the Examples using the treatment liquid, the most upstream head 31 was used for the treatment liquid. The printing medium was fed at a speed presented in Tables 3 and 4. The heads had a nozzle arrangement in which the nozzle density in the direction parallel to the width of the printing medium was 1200 dpi, and the inks were applied at 10 ng/dot onto an OPP film PYLEN (registered trademark) FILM-OT List No. P2111 (thickness: 20 μm, manufactured by TOYOBO), at a resolution of 1200 dpi×1200 dpi. The total application rate presented in Tables 3 and 4 is the total amount per unit are of the treatment liquid and inks applied.

TABLE 3

|  | Example 1 | Example 2 | Example 3 | Example 4 | Example 5 | Example 6 | Example 7 | Example 8 | Example 9 |
|---|---|---|---|---|---|---|---|---|---|
| Treatment liquid | — | — | — | OP1 | OP2 | OP3 | — | — | — |
| Treatment liquid application rate (mg/inch$^2$) | — | — | — | 1 | 1 | 1 | — | — | — |
| Non-white ink | C1 | C3 | C1 | C1 | C1 | C1 | C1 | C2 | C1 |
| Non-white ink application rate (mg/inch$^2$) | 6 | 6 | 6 | 6 | 6 | 6 | 6 | 6 | 6 |
| White ink | W1 | W1 | W1 | W1 | W1 | W1 | W1 | W1 | W1 |
| White ink application rate (mg/inch$^2$) | 12 | 12 | 12 | 12 | 12 | 12 | 12 | 12 | 12 |
| Clear ink | CL1 | CL1 | CL1 | CL1 | CL1 | CL1 | CL3 | CL1 | CL1 |
| Clear ink application rate (mg/inch$^2$) | 2 | 2 | 2 | 2 | 2 | 2 | 2 | 2 | 2 |
| Application order | White last | White last | White last | White last | White last | White last | White last | White last | White last |
| Printing speed (m/min) | 30 | 30 | 50 | 50 | 50 | 50 | 30 | 30 | 30 |
| Heating method | IR | IR | IR | IR | IR | IR | IR | IR | Thermal conduction |
| Laminating film adhesion | A | A | A | B | B | B | AA | B | B |
| Rub resistance | A | B | A | B | A | A | B | B | A |
| Bleeding between white and non-white | A | A | B | A | A | A | A | B | A |
| Deviation of white ink | A | A | A | A | A | A | A | A | A |
| Deviation of non-white inks | A | A | A | A | A | A | A | B | A |
| Deformation of printed item | A | A | A | A | A | A | A | A | B |

TABLE 4

|  | Example 10 | Example 11 | Example 12 | Example 13 | Example 14 | Example 15 | Comparative Example 1 | Comparative Example 2 | Reference Example 1 | Reference Example 2 |
|---|---|---|---|---|---|---|---|---|---|---|
| Treatment liquid | — | — | — | — | — | — | — | — | — | — |
| Treatment liquid application rate (mg/inch$^2$) | — | — | — | — | — | — | — | — | — | — |
| Non-white ink | C1 | C1 | C1 | C1 | C1 | C2 | C1 | C1 | C1 | C1 |
| Non-white ink application rate (mg/inch$^2$) | 6 | 6 | 6 | 6 | 6 | 6 | 6 | 6 | 6 | 6 |
| White ink | W1 | W2 | W3 | W4 | W1 | W5 | W1 | W4 | W1 | W1 |
| White ink application rate (mg/inch$^2$) | 12 | 12 | 12 | 12 | 12 | 12 | 12 | 12 | 12 | 12 |

TABLE 4-continued

| | Example 10 | Example 11 | Example 12 | Example 13 | Example 14 | Example 15 | Comparative Example 1 | Comparative Example 2 | Reference Example 1 | Reference Example 2 |
|---|---|---|---|---|---|---|---|---|---|---|
| Clear ink | CL2 | CL1 | CL1 | CL1 | CL4 | CL1 | — | — | — | CL1 |
| Clear ink application rate (mg/inch$^2$) | 2 | 2 | 2 | 2 | 2 | 2 | — | — | — | 2 |
| Application order | White last | White last | White last | White last | White last | White last | White last | White last | White first | White first |
| Printing speed (m/min) | 30 | 30 | 30 | 30 | 30 | 30 | 30 | 30 | 30 | 30 |
| Heating method | IR | IR | IR | IR | IR | IR | IR | IR | IR | IR |
| Laminating film adhesion | C | B | B | A | AA | A | D | D | A | A |
| Rub resistance | A | B | B | A | B | A | C | C | C | A |
| Bleeding between white and non-white | A | B | A | A | A | B | A | A | A | A |
| Deviation of white ink | A | B | A | A | A | A | A | A | A | A |
| Deviation of non-white inks | A | A | A | A | A | B | A | A | A | A |
| Deformation of printed item | A | A | A | A | A | A | A | A | A | A |

3. 3. Evaluation

The following examinations were conducted. In the examination of the adhesion to a laminating film, samples rated as C or better were determined to be good, and in other examinations, samples rated as B or better were determined to be good.

3. 3. 1. Adhesion to Laminating Film

A solid pattern was printing on the OPP film with the ink jet printer charged with the treatment liquid and the inks under the conditions presented in Tables 3 and 4, followed by drying. The printed OPP film was laminated with another OPP film FKH2 (thickness: 50 μm, manufactured by Futamura Chemical) with an aromatic ether-based adhesive TM329/CAT8B (thickness: 50 μm, manufactured by Toyo-Morton. The printed solid pattern was cut into 15 mm-wide pieces. The peel strength of the laminating film was measured with a tensile tester RTG-1250 (manufactured by A & D) at a peeling speed of 300 mm/min in accordance with the T-peel test specified in JIS K 6854. The results were rated according to the following criteria.

Criteria
- AA: Peel strength of 1.5 N/15 mm or more
- A: Peel strength of 1 N/15 mm to less than 1.5 N/15 mm
- B: Peel strength of 0.5 N/15 mm to less than 1 N/15 mm
- C: Peel strength of 0.2 N/15 mm to less than 0.5 N/15 mm
- D: Peel strength of less than 0.2 N/15 mm 3. 3. 2. Rub Resistance of Printed Item A solid pattern was printing on the OPP film with the ink jet printer charged with the treatment liquid and the inks under the conditions presented in Tables 3 and 4, followed by drying. The printed solid pattern was cut into a rectangular piece of 30 mm×150 mm. The rectangular piece was rubbed with a plain woven cloth 100 times with a Gakushin-type rubbing tester at a load of 500 g, and the degree of peeling of the ink coating of the solid pattern was visually observed.

Criteria
- A: No peeling
- B: Less than 50% of the examined area was peeled.
- C: 50% or more of the examined area was peeled.

3. 3. 3. Bleeding Between Non-White Pattern and White Pattern

A white pattern and a non-white pattern were printed in such a manner that one of the patterns completely covered the other under the printing conditions of 3. 2. and that the white pattern spread wider than the non-white pattern to the outside of the non-white pattern. In a position where the boundary between the non-white pattern and the white pattern was able to be seen when viewed from the non-white pattern side, the degree of the mixing of the non-white ink and the white ink at the boundary was visually observed. The results were rated according to the following criteria. The results rated as B or higher were determined to be no problem.

Criteria
- A: No mixing between white and non-white
- B: The mixing between white and non-white was partial and acceptable.
- C: The mixing between white and non-white was severe and not acceptable in terms of image quality.

3. 3. 4. Deviation of Droplets from the Proper Ejection Paths

After a 10 cm-solid pattern was printed under the conditions presented in Tables 4 and 5 in the environment of 35° C. and 25%, the heads were allowed to stand for 5 minutes with the caps open. Then, 2-point characters and 6-point characters were printed. The conditions of the printed characters were visually observed. Although the inks were properly ejected through all the nozzles without failure, the characters printed in some Examples were illegible due to deviation of ink droplets from the proper ejection paths.

Criteria
- A: All the characters were legible.
- B: 2-point characters were illegible, while 6-point characters were legible.
- C: All the characters were illegible.

3. 3. 5. Deformation of Printed Item

A solid pattern was printing on the OPP film with the ink jet printer charged with the treatment liquid and the inks under the conditions presented in Tables 3 and 4, followed by drying. The resulting printed item was visually observed and evaluated according to the following criteria.

Criteria
- A: There was visible expansion or contraction or any other deformation in the printed item.

B: There was visible but acceptable deformation, such as expansion or contraction, in the printed item.

C: There was visible, large, and unacceptable deformation, such as considerable expansion or contraction, in the printed item.

3. 4. Evaluation Results

The results of the evaluation are presented in Tables 3 and 4.

The printed samples were produced in the rear side printing mode using the white ink, non-white inks, and clear ink. All Examples resulted in satisfactory adhesion to the laminating film, that is, high resistance to laminate peeling. In contrast, the Comparative Examples, which did not satisfy the conditions of the printing method disclosed herein, were insufficient in terms of laminate peel. In Reference Examples, in which the white ink was first applied, no problem arose. Evaluation results will be described in detail below.

Example 1 produced good results in all examinations. Example 2, which used a non-white ink containing the acrylic resin as the resin, produced a printed item having a lower adhesion and rub resistance than the printed item of Example 1. In Example 3, in which the printing speed was increased, bleeding occurred due to insufficient drying. Examples 4 to 6, which used any of the treatment liquids, bleeding was reduced compared to the bleeding in Example 3. However, the treatment liquid reduced the adhesion to the laminating film and, depending on the flocculant, the rub resistance, despite facilitating high-speed printing. Example 7, in which the wax content in the clear ink was reduced, exhibited higher adhesion than Example 1 and reduced rub resistance. In Example 8, in which the organic solvent content in the non-white inks was increased, the printed pattern was not sufficiently dried and, accordingly, the adhesion to the laminating film was reduced compared to the printed pattern in Example 1. In Example 9, in which the heating device was replaced from an IR heater (presented as IR in the Tables) to a thermal conduction heater (presented as thermal conduction in the Tables), the adhesion to the laminating film was reduced and the printed item was deformed, compared to that in Example 1. In Example 10, in which the organic solvent content in the clear ink was increased, the printed pattern was not sufficiently dried and, accordingly, the adhesion to the laminating film was reduced compared to that in Example 1. In Example 11, in which the organic solvent content in the white inks was increased, the printed pattern was not sufficiently dried and, accordingly, the adhesion to the laminating film was reduced compared to the printed pattern in Example 1. Also, the rub resistance, bleeding, and deviation of droplets became worse. In Example 12, which used a white ink containing the acrylic resin as the resin, the adhesion to the substrate was reduced, and the adhesion to the laminating film and the rub resistance of the printed item were degraded compared to those in Example 1. Example 13, in which the white ink did not contain a wax, resulted in improved adhesion to the laminating film. Example 14, in which the clear ink did not contain a wax, resulted in improved adhesion to the laminating film compared to that in Example 1, but the printed item was easy to rub, exhibiting reduced rub resistance. In Example 15, in which the white ink was applied at a relatively low rate, the printed item exhibited higher adhesion to the laminating film and rub resistance than those in Example 8.

Comparative Examples 1 and 2, which did not use the clear ink, resulted in reduced adhesion to the laminating film and rub resistance. Although the white ink used in Comparative Example 2 did not contain a wax, the evaluation results of Comparative Examples 1 and 2 were the same.

Reference Example 1, in which the white ink was first applied, resulted in sufficient adhesion to the laminating film despite no application of clear ink. However, the rub resistance was degraded as in Comparative Example 1.

Reference Example 2, in which the white ink was first applied and the clear ink was used, the rub resistance was improved compared to that in Reference Example 1.

The implementation of the subject matter disclosed herein is not limited to the above-described embodiments, and various modifications may be made. For example, the subject matter disclosed herein may be implemented in substantially the same manner as any of the disclosed embodiments (for example, in terms of function, method, and results, or in terms of purpose and effect). Some elements used in the disclosed embodiments but not essential may be replaced. Implementations capable of producing the same effect as produced in the disclosed embodiments or achieving the same object as in the disclosed embodiments are also within the scope of the subject matter of the present disclosure. A combination of any of the disclosed embodiments with a known art is also within the scope of the subject matter of the present disclosure.

What is claimed is:

1. A printing method for printing a printing medium whose printed side will be laminated by applying a resin film to the printed side of the printing medium after being printed, the method comprising:
    a non-white ink application step of applying an aqueous non-white ink composition containing a non-white coloring material onto the printing medium;
    a white ink application step of applying an aqueous white ink composition containing a white coloring material onto the non-white ink composition on the printing medium; and
    a clear ink application step of applying a clear ink composition containing a resin onto the white ink composition on the printing medium,
    wherein the clear ink composition is an aqueous composition, and
    the resin contained in the clear ink composition is in a form of a dispersion in the clear ink composition.

2. The printing method according to claim 1, wherein the clear ink composition has a wax content limited to 3% or less relative to the total mass of the clear ink composition.

3. The printing method according to claim 1, wherein one of the non-white ink composition and the white ink composition contains a wax, and
    the clear ink composition contains a wax with a content twice or more as high as the wax content in the non-white ink composition and the white ink composition.

4. The printing method according to claim 1, wherein the white ink composition contains a urethane resin.

5. The printing method according to claim 1, wherein the white coloring material contains 8% to 15% of the white coloring material relative to the total mass of the white ink composition.

6. The printing method according to claim 1, wherein the non-white ink application step, the white ink application step, and the clear ink application step are each performed by ejecting the corresponding ink composition from an ink jet head.

7. The printing method according to claim 1, wherein the non-white ink application step, the white ink application step, and the clear ink application step are each performed by ejecting the corresponding ink composition from an ink jet line head having a dimension larger than the width of the printing medium so as to be able to print one entire line of an image by one scanning motion.

8. The printing method according to claim 7, wherein the non-white ink application step and the white ink application step are performed on the printing medium fed at a speed of 15 m/m in or more.

9. The printing method according to claim 1, further comprising:
a post-application drying step of heating the printing medium with an infrared heater after the clear ink application step.

10. The printing method according to claim 1, wherein the clear ink composition is applied at a rate of 0.5 mg/inch$^2$ or more.

11. The printing method according to claim 1, wherein the printing medium is not or poorly absorbent.

12. The printing method according to claim 1, wherein the non-white ink composition and the white ink composition each have an organic solvent content limited to 15% or less relative to the total mass of the corresponding ink composition.

13. The printing method according to claim 1, further comprising:
a lamination step of laminating the printed side of the printing medium with the resin film.

14. The printing method according to claim 1, wherein the printing medium has a thickness of 5 μm to 70 μm.

15. The printing method according to claim 1, wherein the white coloring material is an inorganic oxide pigment.

16. A printing apparatus operable to print a printing medium whose printed side will be laminated by applying a resin film to the printed side of the printing medium after being printed, the printing apparatus comprising:
a non-white ink applying section configured to apply an aqueous non-white ink composition containing a non-white coloring material onto the printing medium;
a white ink applying section configured to apply an aqueous white ink composition containing a white coloring material onto the non-white ink composition on the printing medium; and
a clear ink applying section configured to apply a clear ink composition containing a resin onto the white ink composition on the printing medium,
wherein the clear ink composition is an aqueous composition, and
the resin contained in the clear ink composition is in a form of a dispersion in the clear ink composition.

* * * * *